(12) United States Patent
Chi et al.

(10) Patent No.: US 11,152,671 B2
(45) Date of Patent: Oct. 19, 2021

(54) BATTERY MODULE AND BATTERY PACK INCLUDING THE SAME

(71) Applicant: LG CHEM, LTD., Seoul (KR)

(72) Inventors: Ho-June Chi, Daejeon (KR); Dal-Mo Kang, Daejeon (KR); Jeong-O Mun, Daejeon (KR); Jin-Yong Park, Daejeon (KR); Jung-Hoon Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 218 days.

(21) Appl. No.: 16/463,429

(22) PCT Filed: Jan. 8, 2018

(86) PCT No.: PCT/KR2018/000355
§ 371 (c)(1),
(2) Date: May 23, 2019

(87) PCT Pub. No.: WO2018/216872
PCT Pub. Date: Nov. 29, 2018

(65) Prior Publication Data
US 2020/0381691 A1 Dec. 3, 2020

(30) Foreign Application Priority Data
May 22, 2017 (KR) .................. 10-2017-0062903

(51) Int. Cl.
*H01M 50/502* (2021.01)
*H01M 50/20* (2021.01)
*H01M 50/531* (2021.01)

(52) U.S. Cl.
CPC ......... *H01M 50/502* (2021.01); *H01M 50/20* (2021.01); *H01M 50/531* (2021.01); *H01M 2220/20* (2013.01)

(58) Field of Classification Search
CPC .. H01M 50/502; H01M 50/531; H01M 50/20; H01M 50/204; H01M 50/50; H01M 50/507; H01M 2220/20
See application file for complete search history.

(56) References Cited

U.S. PATENT DOCUMENTS

2007/0111089 A1   5/2007  Swan
2007/0207377 A1   9/2007  Han et al.
(Continued)

FOREIGN PATENT DOCUMENTS

| CN | 103081233 A | 5/2013 |
|---|---|---|
| EP | 2 612 400 B1 | 7/2014 |

(Continued)

OTHER PUBLICATIONS

Translation of WO2012044065, Battery Pack and A Battery Pack Assembly Equipped Therewith, Myung Shin Eng Co., LTD., Sep. 28, 2011 (Year: 2012).*

(Continued)

*Primary Examiner* — Maria Laios
*Assistant Examiner* — Adam J Francis
(74) *Attorney, Agent, or Firm* — Birch, Stewart, Kolasch & Birch

(57) ABSTRACT

A battery module includes a battery cell stack having a plurality of stacked battery cells and a plurality of bus bars respectively coupled to electrode leads provided at the plurality of battery cells. Each bus bar includes a frame on which the electrode lead of the battery cell is placed and a conductive member coupled to the frame and electrically coupled to the electrode lead.

15 Claims, 8 Drawing Sheets

(56) References Cited

U.S. PATENT DOCUMENTS

| | | | |
|---|---|---|---|
| 2011/0104556 A1 | 5/2011 | Kim et al. | |
| 2013/0095359 A1* | 4/2013 | Yoshioka | H01M 50/20 429/99 |
| 2013/0209850 A1 | 8/2013 | Yokoyama et al. | |
| 2015/0303415 A1 | 10/2015 | Kayano et al. | |
| 2015/0380778 A1 | 12/2015 | Kim et al. | |
| 2016/0233476 A1* | 8/2016 | Okamoto | H01M 10/0525 |

FOREIGN PATENT DOCUMENTS

| | | | |
|---|---|---|---|
| EP | 3 046 164 A1 | 7/2016 | |
| JP | 2012-256521 A | 12/2012 | |
| JP | 2013-191538 A | 9/2013 | |
| JP | 2014-22195 A | 2/2014 | |
| JP | 2014-78371 A | 5/2014 | |
| JP | 2014-110219 A | 6/2014 | |
| JP | 2014-135162 A | 7/2014 | |
| JP | 2014-160679 A | 9/2014 | |
| JP | 2014-203763 A | 10/2014 | |
| KR | 10-0928975 B1 | 11/2009 | |
| KR | 10-0932227 B1 | 12/2009 | |
| KR | 10-2012-0033044 A | 4/2012 | |
| KR | 10-1305218 B1 | 9/2013 | |
| KR | 10-2014-0102423 A | 8/2014 | |
| KR | 20150018797 * | 2/2015 | H01M 50/502 |
| KR | 10-2015-0110078 A | 10/2015 | |
| KR | 10-2015-0113758 A | 10/2015 | |
| KR | 10-2016-0000742 A | 1/2016 | |
| KR | 10-2016-0012021 A | 2/2016 | |
| KR | 10-2016-0097013 A | 8/2016 | |
| WO | WO 2011/040297 A1 | 4/2011 | |
| WO | WO-2012044065 A2 * | 4/2012 | H01M 10/425 |
| WO | WO 2014/073443 A1 | 5/2014 | |

OTHER PUBLICATIONS

Translation of KR20150018797 Application, Application Date Feb. 6, 2015, Published Document KR 20160097013 A; LG Chem, LTD, Battery Module (Year: 2015).*

European Search Report for Application No. 18805149.4 dated Feb. 25, 2020.

International Search Report (PCT/ISA/210) issued in PCT/KR2018/000355, dated Jun. 26, 2018.

* cited by examiner

Prior Art

BATTERY MODULE AND BATTERY PACK INCLUDING THE SAME

TECHNICAL FIELD

The present application claims priority to Korean Patent Application No. 10-2017-0062903 filed on May 22, 2017 in the Republic of Korea, the disclosures of which are incorporated herein by reference.

The present disclosure relates to a battery module and a battery pack including the battery module, and more particularly, to a battery module capable of coupling electrode leads to a bus bar without bending the electrode leads.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

FIG. 1 is a diagram showing that an electrode lead and a bus bar provided in a conventional battery cell are electrically coupled to each other. Referring to FIG. 1, in the conventional art, electrode leads 20 respectively provided to a plurality of battery cells 10 are bent to contact a surface of a bus bar 30, and then bonded thereto by welding 40. In this case, a lot of manual works are demanded to a worker in order to maintain a bending shape of the electrode leads 20, and the electrode leads 20 and the bus bar 30 are not closely adhered to each other due to an elastic recovery force of the electrode leads 20 made of a metal. In addition, since the plurality of electrode leads 20 are overlapped at one point of the bus bar 30 and then welded 40, the weldability is deteriorated.

DISCLOSURE

Technical Problem

The present disclosure is directed to providing a battery module capable of closely adhering electrode leads and a bus bar to each other by coupling the electrode leads to the bus bar without bending the electrode leads, and a battery pack including the battery module.

The present disclosure is also directed to providing a battery module capable of having improved weldability since the electrode leads are not overlapped, and a battery pack including the battery module.

The present disclosure is also directed to providing a battery module capable of improving an automation ratio of the production line by eliminating a manual process for bending the electrode leads, and a battery pack including the battery module.

Technical Solution

In one aspect of the present disclosure, there is provided a battery module, comprising: a battery cell stack having a plurality of stacked battery cells, each battery cell having an electrode lead; and a plurality of bus bars respectively coupled to the electrode leads provided at the plurality of battery cells, wherein each bus bar includes: a frame on which the electrode lead of the battery cell is placed; and a conductive member coupled to the frame and electrically coupled to the electrode lead.

Also, an accommodation groove may be formed in the frame, and the conductive member may be inserted into the accommodation groove.

In addition, a spring may be provided in the accommodation groove to give an elastic force to the conductive member.

Also, the spring may be provided as a protrusion protruding with a slope from an edge of the accommodation groove, and the protrusion may be in contact with the conductive member.

In addition, the protrusion may have a rounded portion in a region in contact with the conductive member.

Also, the conductive member may be coupled to the frame by hooking.

In addition, a coupling protrusion may be formed at one side of the frame of the bus bar, and a coupling groove may be formed at the other side thereof, and at the bus bars respectively coupled to the plurality of battery cells, the coupling protrusion of a first bus bar and the coupling groove of a second bus bar adjacent to the first bus bar may be coupled to each other.

Also, hollows may be respectively formed at center portions of the coupling protrusion and the coupling groove, and a support bar may be further provided through the hollow of the coupling protrusion and the hollow of the coupling groove to support the frame.

In addition, the conductive member may further protrude in an outer direction of the frame, and a conductive plate may be further provided to contact the plurality of conductive members and be electrically coupled thereto.

Also, an insert protrusion may be formed at the frame, and an insert groove may be formed at the conductive plate so that the insert protrusion is inserted therein.

Meanwhile, in another aspect of the present disclosure, there is also provided a battery pack including the battery module described above, and there is also provided a vehicle including the battery module.

Advantageous Effects

According to the embodiments of the present disclosure, the electrode leads may be coupled to each bus bar without being bent due to frames and conductive members of individual bus bars, and the electrode leads are not restored by an elastic recovery force, thereby allowing the electrode leads and the bus bar to be closely adhered.

Also, since the plurality of electrode leads are respectively coupled to the plurality of bus bars, the electrode leads are not overlapped, thereby improving the weldability.

In addition, since a manual process for bending the electrode leads is eliminated, an automation ratio of the production line may be improved.

Also, it is possible to standardize the bus bars depending on the size of the battery cells.

BEST MODE

Figure 1:
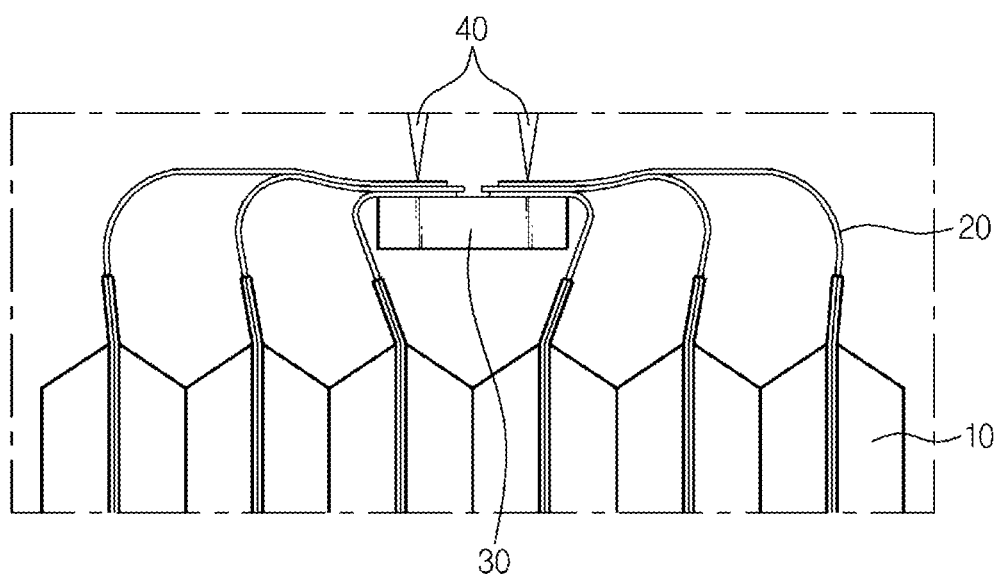
FIG. 1 is a diagram showing that an electrode lead and a bus bar provided in a conventional battery cell are electrically coupled to each other.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 2:
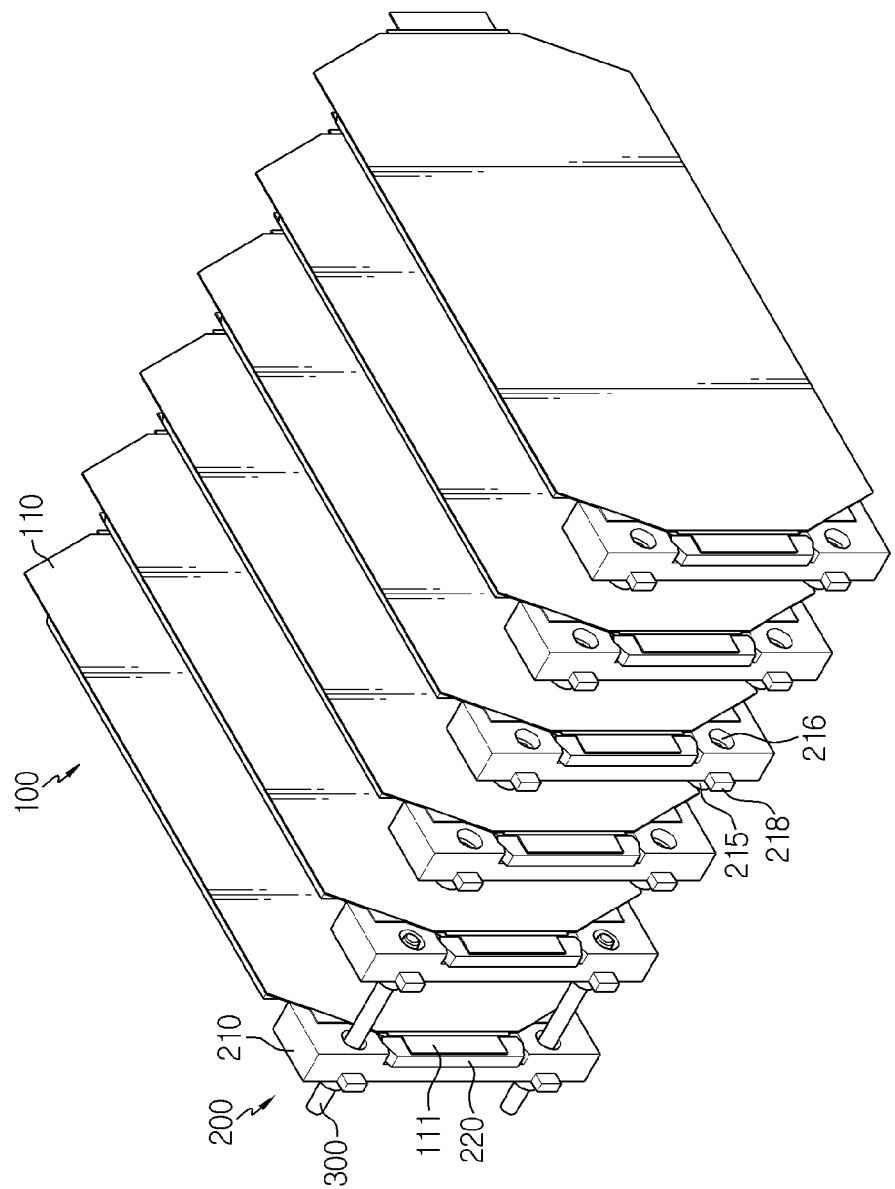
FIG. 2 is a schematic exploded perspective view showing a battery module according to the first embodiment of the present disclosure.
Figure 3:
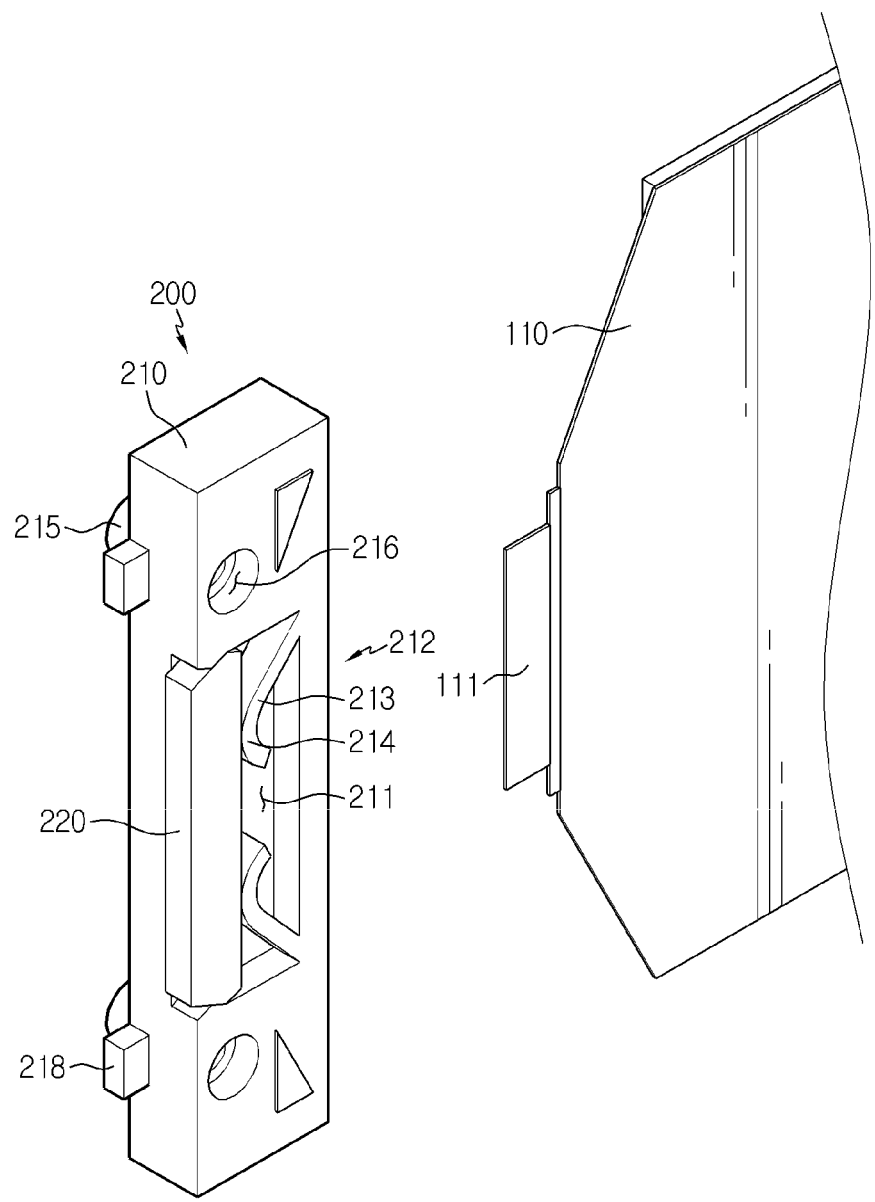
FIG. 3 is a perspective view showing that an electrode lead of an individual battery cell is separated from a bus bar in the battery module according to the first embodiment of the present disclosure.
Figure 4:
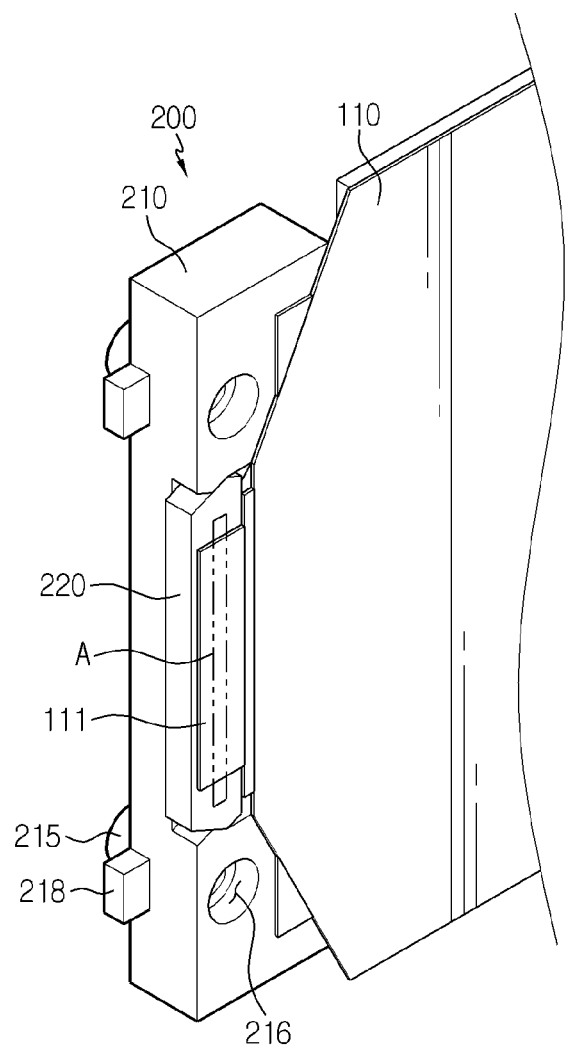
FIG. 4 is a perspective view showing that an electrode lead of an individual battery cell is coupled to the bus bar in the battery module according to the first embodiment of the present disclosure.
Figure 5:
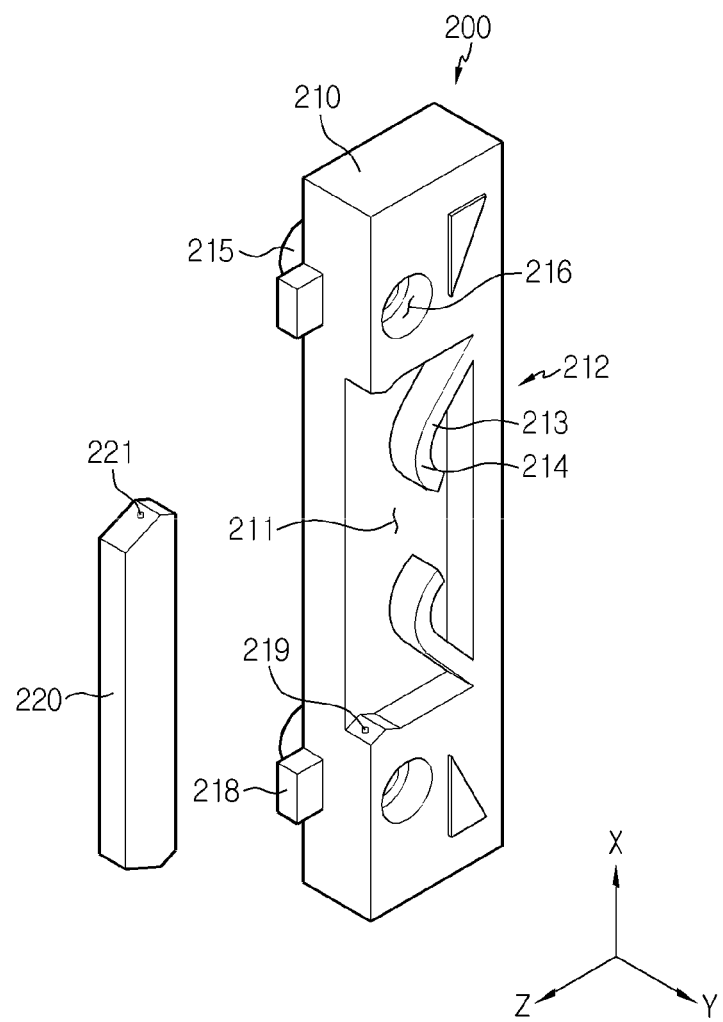
FIG. 5 is an exploded perspective view showing a frame and a conductive member of the bus bar in the battery module according to the first embodiment of the present disclosure.

FIG. 2 is a schematic exploded perspective view showing a battery module according to the first embodiment of the present disclosure, FIG. 3 is a perspective view showing that an electrode lead of an individual battery cell is separated from a bus bar in the battery module according to the first embodiment of the present disclosure, FIG. 4 is a perspective view showing that an electrode lead of an individual battery cell is coupled to the bus bar in the battery module according to the first embodiment of the present disclosure, and FIG. 5 is an exploded perspective view showing a frame and a conductive member of the bus bar in the battery module according to the first embodiment of the present disclosure.

Referring to FIGS. 2 to 5, a battery module according to an embodiment of the present disclosure includes a battery cell stack 100 and a plurality of bus bars 200.

The battery cell stack 100 may be configured so that a plurality of battery cells 110 are stacked therein (see FIG. 2). The battery cells 110 may have various structures, and the plurality of unit cells 110 may be stacked in various ways. The battery cell 110 may be configured so that a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity.

The battery cell 110 may have an electrode lead 111. The electrode lead 111 is a type of terminal that is exposed to the outside and connected to an external device, and the electrode lead 111 may be made of a conductive material. The electrode lead 111 may include a positive electrode lead and a negative electrode lead. The positive electrode lead and the negative electrode lead may be disposed in opposite directions with respect to the longitudinal direction of the battery cell 110, or the positive electrode lead and the negative electrode lead may be positioned in the same direction with respect to the longitudinal direction of the battery cell 110. The electrode lead 111 is electrically coupled to a conductive member 220 of the bus bar 200, explained later.

The battery cell stack 100 may include a plurality of cartridges (not shown) for accommodating the battery cells 110. Each cartridge (not shown) may be fabricated by injection-molding plastic, and a plurality of cartridges (not shown) having an accommodation portion for accommodating the battery cell 110 may be stacked. A cartridge assembly in which a plurality of cartridges (not shown) are stacked may include a connector element or a terminal element. The connector element may include various types of electrical connecting components or connecting components for connecting to, for example, a battery management system (BMS)(not shown) capable of providing data on voltage or temperature of the battery cells 110. In addition, the terminal element includes a positive electrode terminal and a negative electrode terminal as main terminals connected to the battery cell 110, and the terminal element may have a terminal bolt to be electrically connected to the outside. Meanwhile, the battery cell 110 may have various shapes.

The bus bar 200 is coupled to the electrode leads 111 respectively provided at the plurality of battery cells 110 to electrically connect the electrode leads 111. Here, the electric connection may include serial or parallel connection.

The bus bar 200 includes a frame 210 and a conductive member 220. Hereinafter, the frame 210 and the conductive member 220 will be described.

The frame 210 is coupled to the conductive member 220, and the battery cell 110 and the electrode lead 111 of the battery cell 110 are placed thereon. That is, referring to FIGS. 3 and 4, in a state where the conductive member 220 is coupled to the frame 210, the battery cell 110 is placed on the frame 210 so that the electrode lead 111 and the conductive member 220 are in contact with each other, and the conductive member 220 and the electrode lead 111 may be electrically coupled by welding A (see FIG. 4), for example laser welding.

An accommodation groove 211 may be formed at the frame 210, and the conductive member 220 may be inserted into the accommodation groove 211 formed at the frame 210. The accommodation groove 211 may have various sizes, shapes and types as long as the conductive member 220 is able to inserted and fixed therein. The conductive member 220 may be inserted into the frame 210 and protrude out of the frame 210. Various tools or devices may be electrically connected to the conductive member 220 protruding out of the frame 210.

An elasticity providing unit 212 for providing an elastic force to the conductive member 220 may be provided in the accommodation groove 211 formed at the frame 210. The elasticity providing unit 212 may be in contact with the conductive member 220 so that the conductive member 220 keeps protruding out of the frame 210, and gives an elastic force capable of maintaining the contact when various tools or devices are connected to the conductive member 220. The elasticity providing unit 212 may be provided in various ways as long as it is able to contact the conductive member 220 to provide an elastic force to the conductive member 220. For example, the elasticity providing unit 212 may be provided using various springs such as a coil spring or a leaf spring. Alternatively, referring to FIG. 5, the elasticity providing unit 212 may be provided as a protrusion 213 protruding with a slope from an edge of the accommodation groove 211 formed at the frame 210. Here, if the frame 210 is made by injection-molding plastic, the protrusion 213 may be formed integrally with the frame 210. In addition, the protrusion 213 is in contact with one side of the conductive member 220, for example a lower side of the conductive member 220 based on a direction of an arrow Z in FIG. 5, assuming that the direction of the arrow Z is an upper direction, to give an elastic force to the conductive member 220 and support the conductive member 220. In addition, the protrusion 213 may have a rounded portion 214 at a region that contacts the conductive member 220. By this structure, the conductive member 220 may be supported while receiving an elastic force.

The conductive member 220 is made of various materials such as electrically conductive metal and is coupled to the frame 210 and electrically coupled to the electrode lead 111. For example, the conductive member 220 may be inserted into the accommodation groove 211 formed at the frame 210 and supported by the elasticity providing unit 212. Here, referring to FIGS. 3 and 5, the conductive member 220 may be inserted into the accommodation groove 211 of the frame 210 and then coupled to the frame 210 in various ways, for example by hooking. That is, a hooking protrusion 221 may be formed at the conductive member 220 and a hooking groove 219 may be formed at the frame 210 so as to be coupled to each other, or a hooking groove (not shown) may be formed at the conductive member 220 and a hooking protrusion (not shown) may be formed at the frame 210 so as to be coupled to each other. However, the coupling protrusion and the coupling groove may be coupled in various ways other than hooking. The conductive member 220 may be coupled and fixed to the frame 210 by, for example, hooking at a side surface thereof and may be supported by the elasticity providing unit 212 at a lower side. In a state where the conductive member 220 is coupled to the frame 210 as described above, the electrode lead 111 of the battery cell 110 may be placed on the bus bar 200 and contact the conductive member 220 of the bus bar 200, and they may be electrically connected to each other in a state where the electrode lead 111 is in contact with the conductive member 220 (see FIGS. 3 and 4).

In other words, in the battery module according to the first embodiment of the present disclosure, the bus bar 200 is respectively coupled to the individual battery cell 110. Also, since the electrode lead 111 is coupled to the conductive member 220 of the bus bar 200 without being bent, the electrode lead 111 and the bus bar 200 may be in close contact with each other. In addition, since the electrode leads 111 are not overlapped with each other, the weldability is improved. Moreover, since a manual process for bending the electrode leads 111 is eliminated, an automation ratio of the production line may be improved.

Figure 6:
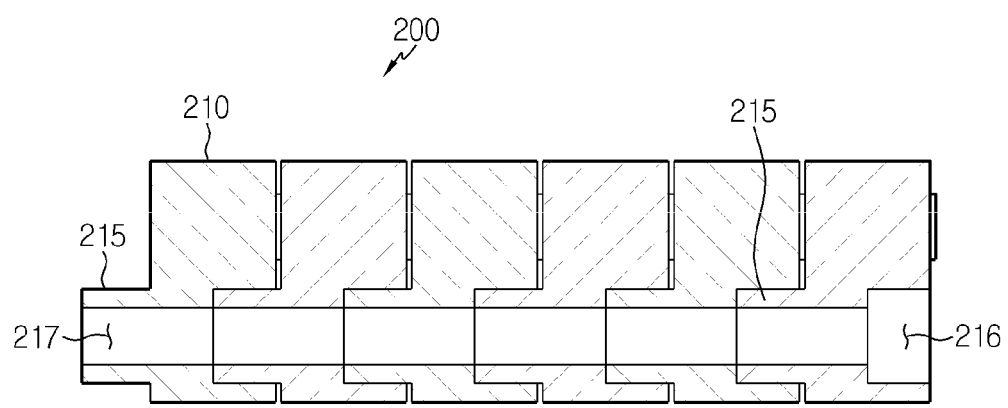
FIG. 6 is a cross-sectioned view showing that the bus bars are coupled to each other in the battery module according to the first embodiment of the present disclosure.
Figure 7:
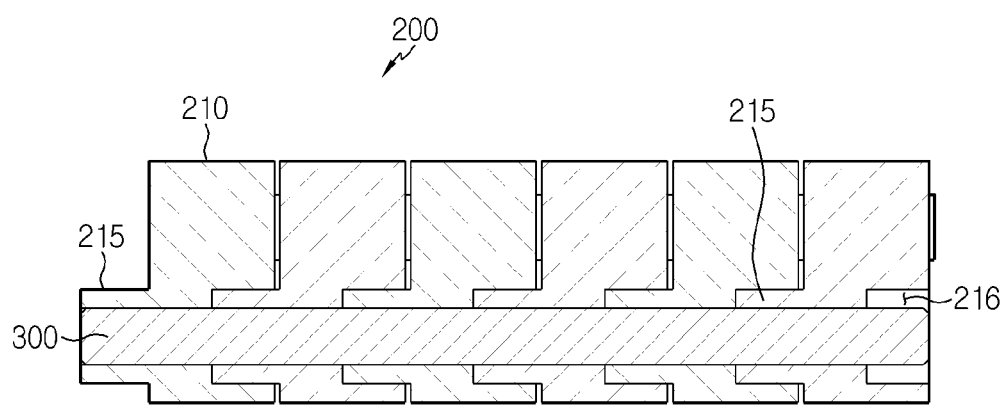
FIG. 7 is a cross-sectioned view showing that a support bar is coupled after the bus bars are coupled to each other in the battery module according to the first embodiment of the present disclosure.

FIG. 6 is a cross-sectioned view showing that the bus bars are coupled to each other in the battery module according to the first embodiment of the present disclosure, and FIG. 7 is a cross-sectioned view showing that a support bar is coupled after the bus bars are coupled to each other in the battery module according to the first embodiment of the present disclosure.

Referring to FIG. 6, in the battery module according to the first embodiment of the present disclosure, the bus bars 200 may be coupled to each other to support the battery module. For this, a coupling protrusion 215 may be formed at one side of the frame 210 of the bus bar 200, and a coupling groove 216 may be formed at the other side of the frame 210, which is opposite to the one side of the frame 210. If a plurality of battery cells 110 are stacked, a plurality of bus bars 200 respectively coupled to the plurality of battery cells 110 are aligned with each other. Here, the coupling protrusion 215 of the frame 210 of any one bus bar 200 among the plurality of bus bars 200 is coupled to the coupling groove 216 of the frame 210 of another one bus bar 200 adjacent to the frame 210 of the any one bus bar 200. In this way, the bus bars 200 may be coupled to and supported by each other. The coupling protrusion 215 and the coupling groove 216 may be formed to have a size and shape that may correspond to each other.

In addition, a hollow 217 (see FIG. 6) may be formed in the center portions of the coupling protrusion 215 and the coupling groove 216, respectively. Also, referring to FIG. 7, a support bar 300 may be coupled to the frame 210 of the bus bar 200 through the hollow 217 of the coupling protrusion 215 and the hollow 217 of the coupling groove 216 so that the support bar 300 may support the plurality of frames 210, thereby ensuring the rigidity of the frames 210 of the bus bars 200. Here, the support bar 300 may have various shapes, for example with a circular cross section. However, the shape of the support bar 300 is not limited thereto.

Hereinafter, the operation and effect of the battery module according to the first embodiment of the present disclosure will be described with reference to the drawings.

A battery cell stack 100 is formed by stacking a plurality of battery cells 110, and bus bars 200 are coupled to the electrode leads 111 of the plurality of battery cells 110, respectively. The bus bar 200 includes a frame 210 and a conductive member 220. After the conductive member 220 is coupled to the frame 210, the electrode lead 111 of the battery cell 110 is electrically coupled to the conductive member 220 by welding or the like. Since the plurality of bus bars 200 having the frame 210 and the conductive member 220 are respectively coupled to the electrode leads 111 of the battery cell 110, the electrode leads 111 may be electrically coupled to the bus bar 200 without being bent, and thus the leads 111 and the bus bar 200 may be in close contact with each other.

A coupling protrusion 215 and a coupling groove 216 may be formed at the frame 210 of the bus bar 200, and neighboring frames 210 may be coupled to each other by means of the coupling protrusion 215 and the coupling groove 216. Also, the support bar 300 may be inserted through the hollows 217 respectively formed in the coupling protrusion 215 and the coupling groove 216, thereby supporting the frame 210 and ensuring the rigidity.

Figure 8:
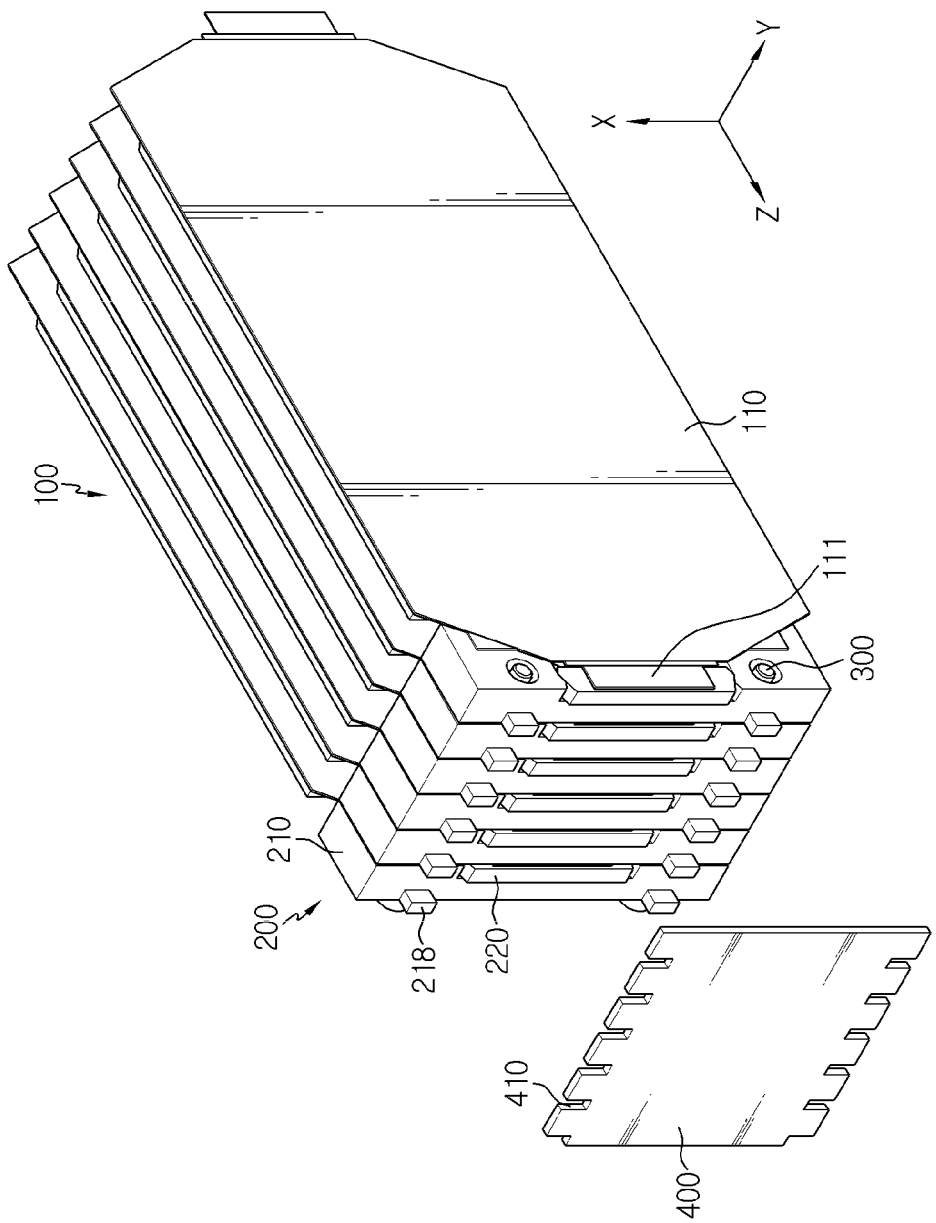
FIG. 8 is a perspective view showing that a conductive plate is separated from a bus bar in a battery module according to the second embodiment of the present disclosure.
Figure 9:
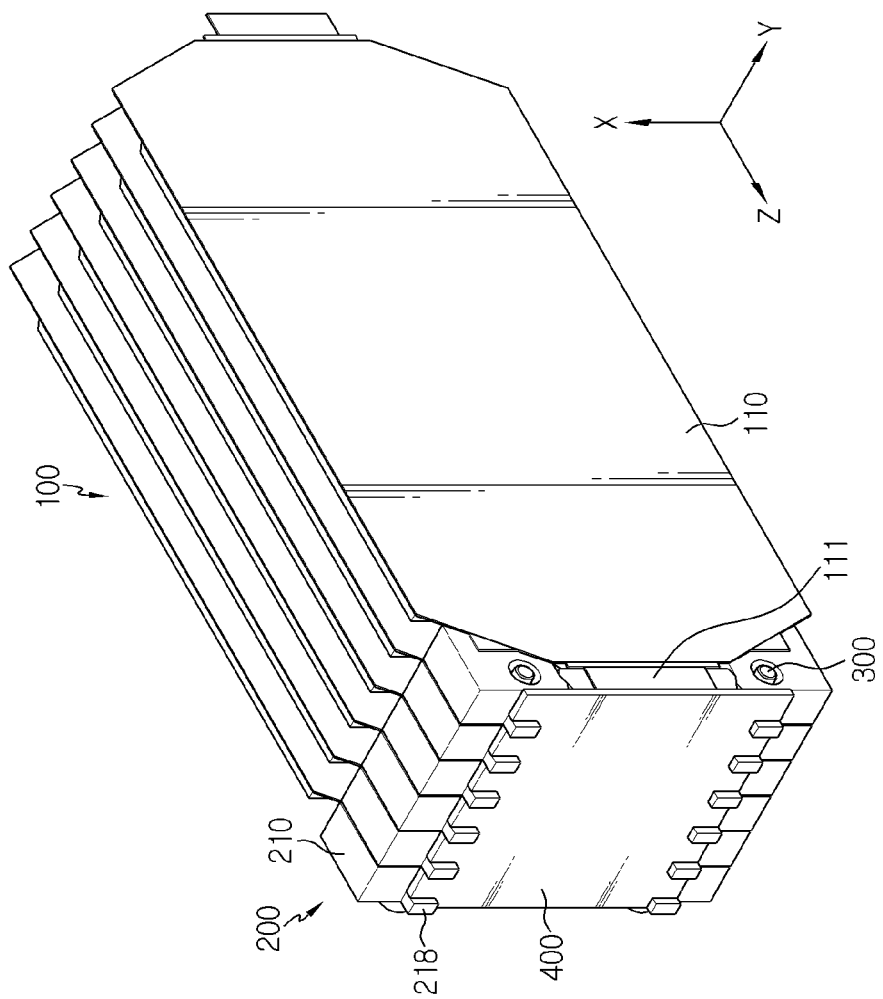
FIG. 9 is a perspective view showing that the conductive plate is coupled to the bus bar in the battery module according to the second embodiment of the present disclosure.

FIG. 8 is a perspective view showing that a conductive plate is separated from a bus bar in a battery module according to the second embodiment of the present disclosure, and FIG. 9 is a perspective view showing that the conductive plate is coupled to the bus bar in the battery module according to the second embodiment of the present disclosure.

Hereinafter, the function and effect of a battery module according to the second embodiment according to the present disclosure will be described with reference to the drawings, but features common to the battery module according to the first embodiment of the present disclosure will not be described again in detail.

The second embodiment of the present disclosure is different from the first embodiment in that a conductive plate 400 coupled to the bus bar 200 is further provided.

The battery module of the present disclosure may be individually connected to various tools or devices in a state where the plurality of bus bars 200 are open as in the first embodiment, or the conductive plate 400 may be electrically connected to other tools or devices after the plurality of bus bars 200 are electrically connected to the conductive plate 400 as in the second embodiment.

Referring to FIG. 8, as explained above in the first embodiment, the frames 210 of the bus bars 200 may be coupled to each other by means of the coupling protrusion 215 and the coupling groove 216 and supported by the support bar 300. Here, the conductive member 220 protrudes in an outer direction of the frame 210, for example, in an upper direction of the frame 210 if a direction of an arrow Z is an upper direction based on the arrow Z of FIG. 8, and the conductive plate 400 contacts and is electrically connected to the plurality of conductive members 220 protruding upward (see FIG. 9). An insert protrusion 218 may be formed at the frame 210 and an insert groove 410 into which the insert protrusion 218 is inserted may be formed at the conductive plate 400 so that the conductive plate 400 may be coupled to the frame 210 of the bus bar 200. Alternatively, an insert protrusion (not shown) may be formed at the conductive plate 400 and an insert groove (not shown) into which the insert protrusion (not shown) is inserted may be formed at the frame 210.

Meanwhile, a battery pack (not shown) according to an embodiment of the present disclosure may include one or more battery modules according to an embodiment of the present disclosure as described above. Also, in addition to the battery modules, the battery pack (not shown) may further includes a case for accommodating the battery modules, and various devices for controlling charge and discharge of the battery modules, such as a BMS, a current sensor, a fuse, and the like.

Meanwhile, a vehicle (not shown) according to an embodiment of the present disclosure may include the battery module or the battery pack (not shown) described above, and the battery pack (not shown) may include the battery module. In addition, the battery module according to an embodiment of the present disclosure may be applied to the vehicle (not shown), for example, a predetermined vehicle (not shown) provided to use electricity like an electric vehicle or a hybrid electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure is directed to a battery module and a battery pack including the battery module, and is particularly applicable to industries associated with a secondary battery.

What is claimed is:
1. A battery module, comprising:
a battery cell stack having a plurality of stacked battery cells, each battery cell having an electrode lead; and
a plurality of bus bars respectively coupled to the electrode leads provided at the plurality of battery cells,
wherein each bus bar includes:
a frame on which the electrode lead of the battery cell is placed, the frame having an outer edge and a first surface;
an accommodation groove formed in the first surface of the frame, the accommodation groove having a plurality of sidewalls;
a spring attached to a first sidewall of the plurality of sidewalls, the spring extending into the accommodation groove; and
a conductive member retained in the accommodation groove and electrically coupled to the electrode lead,
wherein the conductive member extends beyond the outer edge of the frame.

2. The battery module according to claim 1, wherein the spring has a first section attached to the first sidewall of the accommodation groove, and a curved second section contacting the conductive member.

3. The battery module according to claim 2, wherein the protrusion has a rounded portion in a region in contact with the conductive member.

4. The battery module according to claim 1, wherein the conductive member is coupled to the frame by hooking.

5. The battery module according to claim 1, wherein a coupling protrusion is formed in a second surface of the frame of the bus bar opposite the first surface, and a coupling groove is formed at the first surface, and wherein at the bus bars respectively coupled to the plurality of battery cells, the coupling protrusion of a first bus bar and the coupling groove of a second bus bar adjacent to the first bus bar are coupled to each other.

6. The battery module according to claim 5, wherein hollows are respectively formed at center portions of the coupling protrusion and the coupling groove, and a support bar is further provided through the hollow of the coupling protrusion and the hollow of the coupling groove to support the frame.

7. The battery module according to claim 5, wherein the conductive member further protrudes in an outer direction of the frame, and a conductive plate is further provided to contact the plurality of conductive members and be electrically coupled thereto.

8. The battery module according to claim 7, wherein an insert protrusion is formed at the frame, and an insert groove is formed at the conductive plate so that the insert protrusion is inserted therein.

9. A battery pack, comprising a battery module defined in claim 1.

10. A vehicle, comprising a battery module defined in claim 1.

11. The battery module according to claim 1, further comprising an opening in the frame opposite the first side of the accommodation groove, and wherein the conductive member extends into the opening.

12. The battery module according to claim 11, further comprising a pair of hooking grooves extending into the opening, and wherein the pair of hooking grooves respectively contact a pair of hooking protrusions on the conductive member.

13. The battery module according to claim 1, wherein the first side wall is opposite the opening.

14. The battery module according to claim 1, wherein the frame has a first sidewall, wherein the conductive member extends beyond the first sidewall of the frame, and wherein protrusions extend from the first sidewall of the frame.

15. The battery module according to claim 14, further comprising a conductive plate attached to the frame by engaging the protrusion on the first sidewall of the frame.

* * * * *